United States Patent
Cohen et al.

(10) Patent No.: US 12,235,829 B2
(45) Date of Patent: Feb. 25, 2025

(54) SYSTEMS AND METHODS FOR GENERATING INTERRELATED NOTIONAL DATA

(71) Applicant: Palantir Technologies Inc., Denver, CO (US)

(72) Inventors: Hannah Cohen, Morrisville, PA (US); Myles Novick, New York, NY (US); Timothy Schwab, Washington, DC (US)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 18/239,471

(22) Filed: Aug. 29, 2023

(65) Prior Publication Data

US 2024/0070141 A1 Feb. 29, 2024

Related U.S. Application Data

(60) Provisional application No. 63/402,599, filed on Aug. 31, 2022.

(51) Int. Cl.
*G06F 16/00* (2019.01)
*G06F 16/21* (2019.01)
(Continued)

(52) U.S. Cl.
CPC ........ *G06F 16/2365* (2019.01); *G06F 16/213* (2019.01); *G06F 16/2379* (2019.01);
(Continued)

(58) Field of Classification Search
CPC ............... G06F 16/2365; G06F 16/213; G06F 16/24564; G06F 16/284; G06F 16/84;
(Continued)

(56) References Cited

U.S. PATENT DOCUMENTS 7,711,675 B2 * 5/2010 Anonsen ............... G06F 16/289
717/137
7,792,800 B1 * 9/2010 Carson, Jr. ............ G06F 16/213
707/640
(Continued)

FOREIGN PATENT DOCUMENTS

EP 2597573 B1 * 8/2018
WO WO2003029923 A2 * 4/2003
(Continued)

OTHER PUBLICATIONS

Phanwadee Sinthong et al., "AFrame: Extending DataFrames for Large-Scale Modern Data Analysis", 2019 IEEE International Conference on Big Data (Big Data) (Dec. 2019, pp. 359-371).*
(Continued)

*Primary Examiner* — Srirama Channavajjala
(74) *Attorney, Agent, or Firm* — Faegre Drinker Biddle & Reath LLP—Palantir (57) ABSTRACT

Disclosed herein are systems and methods for generating notional data. The method includes: receiving seed data of one or more object types in a base dataframe; defining one or more functional relationships associated with the one or more object types, at least one functional relationship of the one or more functional relationships specifying a change to seed data of one object type of the one or more object types; generating data of the one or more object types based at least in part on the seed data in the base dataframe and the one or more functional relationships; and generating the notional data based at least in part on the generated data of the one or more object types.

18 Claims, 4 Drawing Sheets

(51) Int. Cl.
*G06F 16/23* (2019.01)
*G06F 16/242* (2019.01)
*G06F 16/2455* (2019.01)
*G06F 16/28* (2019.01)
*G06F 21/60* (2013.01)

(52) U.S. Cl.
CPC ...... *G06F 16/2423* (2019.01); *G06F 16/2456* (2019.01); *G06F 16/289* (2019.01); *G06F 21/60* (2013.01)

(58) Field of Classification Search
CPC .... G06F 16/9566; G06F 16/258; G06F 21/60; G06F 16/211–214; G06F 16/289; G06F 16/2456; G06F 16/2379; G06F 16/2423
See application file for complete search history.

(56) References Cited

U.S. PATENT DOCUMENTS

| | | | | |
|---|---|---|---|---|
| 8,407,255 | B1* | 3/2013 | Srivastava | G06F 16/2456 707/791 |
| 2006/0212846 | A1* | 9/2006 | O'Farrell | H04L 67/01 717/116 |
| 2008/0046834 | A1* | 2/2008 | Yu | G06Q 10/06316 715/771 |
| 2010/0318481 | A1* | 12/2010 | Feynman | G06F 11/3684 717/124 |
| 2011/0184990 | A1* | 7/2011 | Murphy | G06F 8/41 707/791 |
| 2011/0313945 | A1* | 12/2011 | Callan | G06Q 40/00 705/36 R |
| 2012/0041989 | A1* | 2/2012 | Banahatti | G06Q 40/02 707/804 |
| 2013/0159036 | A1* | 6/2013 | Keil | G06Q 10/06 705/7.12 |
| 2014/0025696 | A1* | 1/2014 | Amano | G06F 16/9566 707/756 |
| 2014/0279910 | A1* | 9/2014 | Prasanna | G06F 16/258 707/639 |
| 2015/0081832 | A1* | 3/2015 | Handa | H04L 63/0428 709/213 |
| 2016/0055220 | A1* | 2/2016 | Joshi | G06F 16/319 707/722 |
| 2018/0004782 | A1* | 1/2018 | Greenwood | G06F 16/213 |
| 2019/0065053 | A1* | 2/2019 | Eads | G06F 3/065 |
| 2022/0076333 | A1* | 3/2022 | Thornberg | G06Q 40/04 |
| 2022/0309342 | A1* | 9/2022 | Borgohain | G06N 3/047 |

FOREIGN PATENT DOCUMENTS

WO WO 2007079467 A2 * 7/2007
WO WO2019094606 A1 * 5/2019

OTHER PUBLICATIONS

Aug. 24, 2022 Snapshot of webpage: https://spark.apache.org/.
Aug. 15, 2024 Snapshot of webpage: https://faker.readthedocs.io/en/master/.

* cited by examiner

SYSTEMS AND METHODS FOR GENERATING INTERRELATED NOTIONAL DATA

CROSS REFERENCE TO RELATED APPLICATION

This application claims priority to U.S. Provisional Application No. 63/402,599, filed Aug. 31, 2022, incorporated by reference herein in its entirety for all purposes.

TECHNICAL FIELD

Certain embodiments of the present disclosure are directed to systems and methods for dataset generation. More particularly, some embodiments of the present disclosure provide systems and methods for generating notional data.

BACKGROUND

Large scale data analysis encompasses tools and systems utilized to process and analyze large amount of data, also referred to as "big data", via techniques such as parallel database management. Spanning many fields of science and technology, big data processing is important in fields of technology such as distributed systems, machine learning and artificial intelligence, statistics, and Internet of Things (IoT), for example, and includes the collecting, processing, cleaning, and analyzing of large datasets to help organizations operationalize and extract patterns, correlations, trends, and any other data characteristics from the big data.

For example, software web applications may utilize distributed file system for the big data processing. In order to confirm that their data analysis software applications are capable of effectively process and analyze the big data, software developers and researchers often perform numerous tests using a sufficiently large set of realistic data. However, using actual real-world data is problematic due to concerns about privacy and data integrity.

Hence it is highly desirable to improve the techniques for dataset generation.

SUMMARY

Certain embodiments of the present disclosure are directed to systems and methods for dataset generation. More particularly, some embodiments of the present disclosure provide systems and methods for generating notional data.

Disclosed are methods and systems for generating notional data. According to some embodiments, the method includes: receiving seed data of one or more object types in a base dataframe; defining one or more functional relationships associated with the one or more object types, at least one functional relationship of the one or more functional relationships specifying a change to seed data of one object type of the one or more object types; generating data of the one or more object types based at least in part on the seed data in the base dataframe and the one or more functional relationships; and generating the notional data based at least in part on the generated data of the one or more object types. The method is performed using one or more processors.

According to some embodiments, a system for generating notional data includes: one or more memories having instructions stored therein; and one or more processors configured to execute the instructions and perform operations comprising: receiving seed data of one or more object types in a base dataframe; defining one or more functional relationships associated with the one or more object types, at least one functional relationship of the one or more functional relationships specifying a change to seed data of one object type of the one or more object types; generating data of the one or more object types based at least in part on the seed data in the base dataframe and the one or more functional relationships; and generating the notional data based at least in part on the generated data of the one or more object types.

According to some embodiments, a method for generating notional data includes: receiving seed data of one or more object types in a base dataframe; defining one or more functional relationships associated with the one or more object types, at least one functional relationship of the one or more functional relationships specifying a change to seed data of one object type of the one or more object types; adding, in one intermediate dataframe of a plurality of intermediate dataframes, one or more system columns to one or more data structures corresponding to the one or more object types based at least in part on the one or more functional relationships; filling relationship data in the one or more system columns in the one or more data structures in the one intermediate dataframe of the plurality of intermediate dataframes based at least in part on the one or more functional relationships; generating data of the one or more object types in the one intermediate dataframe of the plurality of dataframes based at least in part on the seed data in the base dataframe and the one or more functional relationships; and generating the notional data based at least in part on the generated data of the one or more object types. The method is performed using one or more processors.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

The accompanying drawings are incorporated in and constitute a part of this specification and, together with the description, explain the features and principles of the disclosed embodiments. In the drawings.

DETAILED DESCRIPTION

Conventional systems and methods are unable to create a complex web of interrelated datasets within one or more dataframes. For example, the existing technology is not able to perform well at creating domain-specific randomness due to its inability to utilize existing datasets (e.g., within one or more dataframes including data at one or more times). In some cases, conventional systems and methods attempt to capture the interrelatedness of real-world dataset after anonymizing the data in order to protect privacy of the subjects involved. However, such practice may have security risks if the data is subject to security breaches prior to anonymization and/or the anonymized data is reidentified.

Various embodiments of the present disclosure can achieve benefits and/or improvements by a computing system incorporating dataset generation processes. In some embodiments, benefits include improvements including, for example, reducing risks involved in using existing real-world datasets. In some examples, benefits include certain levels of reproducibility of the generated datasets by using the same seed data to ensure that datasets with similar mathematical or computational properties (while not being identical) can still be generated. In certain examples, benefits include reducing or avoiding bias in the generated datasets, for example, in training computational models (e.g., machine learning (ML) models, deep learning (DL) models, large language models (LLMs), etc.). In some embodiments, benefits also include improved integrity of the datasets that are generated, such that users (e.g., software developers and researchers) can be assured of the reliability of the data that is being used to test their software applications, for example.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in the same software. In certain embodiments, the term "access" or "accessing" means retrieving data or information, and/or generating data or information.

According to certain embodiments, synthetically and randomly generated datasets are utilized to provide one or more software systems with a large set of data that resembles, but is not, real-world data, where the generated datasets have similar properties as real-world dataset, and can be used in lieu of real-world dataset. In some examples, the existing technology is unable to create a complex web of interrelated datasets within one or more dataframes. In certain examples, unlike real-world dataset in which certain data may be interrelated or intercorrelated, datasets that are synthetically generated using existing technology cannot recreate the complexity of real-world datasets, and thus, fail to capture the interrelated or intercorrelated properties which may exist in some of the data in real-world situations. As such, there is a need for dataset generation techniques that are capable of generating notional data in large quantities and still capturing the interrelated properties or characteristics within the dataframe(s) as are present in real-world data.

According to some embodiments, the systems and methods for generating notional data (e.g., notional datasets) can use a software library to simplify and/or accelerate the process of creating large amounts of complex and interrelated notional datasets. In some embodiments, notional data refers to mock data including interrelated datasets, for example, datasets for a specific domain and/or with specific functional relationships between datasets. In certain embodiments, it can be used in a wide range of domains, either creating data from scratch or by starting from an existing data foundation (e.g., existing datasets). In some embodiments, the systems and methods are not used for anonymization of existing data but for the generation of new data. In certain embodiments, the systems and methods are used for the generation of new data and anonymization of existing data.

As an example, existing technology is unable to create a complex web of interrelated datasets, within one or more dataframes. In some embodiments, one or more interrelated datasets are in a dataframe. In certain embodiments, a dataframe includes one or more datasets including data at a specific time. In some embodiments, a first dataframe includes one or more datasets including data at a first time, and a second dataframe includes one or datasets including data at a second time. In certain embodiments, the data at the first time is different from the data at the second time. For example, the existing technology is not able to perform well at creating domain-specific randomness due to its inability to utilize existing datasets (e.g., within one or more dataframes).

According the certain embodiments, the notional data generation system is configured to define data relationships in a top-down approach, with at least a part of the relationships captured in individual data records. In some embodiments, the notional data generation system is designed to include one or more of four components: the controller, frontend objects, commands, and backend objects. In some embodiments, the controller serves as a central object (e.g., a software object, a software module) that joins together the disparate objects. In certain embodiments, the frontend objects are created through the controller's API and receive commands from the user via respective frontend APIs. In some embodiments, these commands are registered with the controller and stored for use later. In certain embodiments, a session is created and given to the controller, and the controller executes each of the commands (e.g., received commands, registered commands) against one or more backend objects.

According to some embodiments, the controller creates one or more frontend objects and the one or more frontend objects create one or more respective backend objects. In certain embodiments, the one or more frontend objects are configured to receive commands from the user, pass these commands to the controller to store, then execute these commands against the one or more backend objects. In some embodiments, among other things, this allows the notional data generation system to automatically detect what inputs it requires and import them.

According to certain embodiments, the one or more backend objects contain one or more functional modules (e.g., the bulk of the logic), for example, configured to wrap one or more datasets.

According to some embodiments, the notional data generation system includes one or more object types associated with a command to receive a configuration object (e.g., configuration of columns) to create with notional data (e.g., mock data, fake data, test data, training data, validation data, etc.). In certain embodiments, the notional data generation system is optimized to utilize distributions (e.g., high-scale distributions) in order to generate large amounts of notional data. In some examples, this is done with a seed to ensure reproducibility.

According to certain embodiments, one or more objects, for example, in the notional dataset, have an internal structure given by a number of system columns (e.g., system columns, numeric columns) that allow for functional relationships (e.g., joining) between objects. In some embodiments, the notional data generation system is configured to use system columns (e.g., assist columns, reference columns, structure columns, standard numeric structure columns) in order to replicate useful data structures.

According to some embodiments, the notional data generation system is configured to generate data using one or more backend object types (e.g., object types containing data-variation logics), which include logics for data generation, including simple lists, hierarchies, time series (e.g., time logs), non-overlapping time-blocks, geographic movements, and/or the like. In certain embodiments, the notional data generation system is configured to create more object types. In some embodiments, the system can generate mock data, perform functional operations (e.g., joining) between objects, and perform other commands. In certain embodiments, the mock data (e.g., a simple-list type of data) can also be created from an existing dataset. In some embodiments, data of one object type can be used to generate mock data of another object type. In certain embodiments, the system can generate notional data that contains domain-specific random values (e.g., inventory domain, healthcare domain, etc.).

Figure 1:
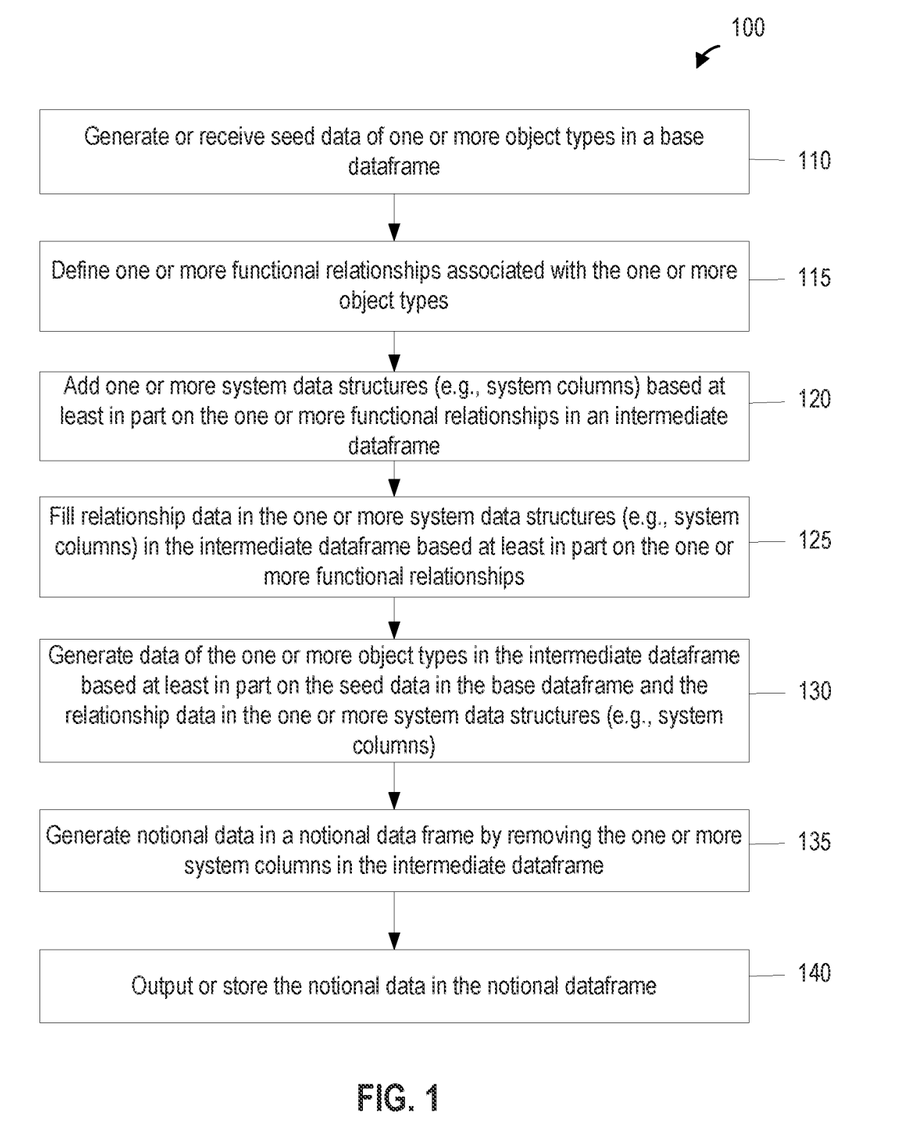
FIG. 1 is a simplified diagram showing a method for generating interrelated notional data according to certain embodiments of the present disclosure.

FIG. 1 is a simplified diagram showing a method 100 for generating notional data according to certain embodiments of the present disclosure. This diagram is merely an example. One of ordinary skill in the art would recognize many variations, alternatives, and modifications. The method 100 for generating notional data includes processes 110, 115, 120, 125, 130, 135, and 140. Although the above has been shown using a selected group of processes for the method 100 for generating notional data, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 100 are performed by the system 600. In certain examples, some or all processes (e.g., steps) of the method 100 are performed by a computer and/or a processor directed by a code. For example, a computer includes a server computer and/or a client computer (e.g., a personal computer). In some examples, some or all processes (e.g., steps) of the method 100 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 110, a notional data generation system is configured to generate or receive seed data of one or more object types (e.g., data columns, person, address, organization, last name, first name, etc.) as a base dataframe. In certain embodiments, data in the base dataframe can be generated using a software application. In some embodiments, a dataset is corresponding to an object type. In certain embodiments, an object type is corresponding to a data column, and the dataframe is corresponding to a table. In some embodiments, data in the base dataframe can be generated using an existing software application for generating mock data.

According to certain embodiments, at the process 115, the notional data generation system is configured to define one or more functional relationships between two or more datasets in a dataframe and/or functional relationships between two or more dataframes (e.g., between a base dataframe and an intermediate dataframe). In some embodiments, the functional relationships include, for example, simple lists, hierarchical relationship, time-based relationship, time-series relationship (e.g., time logs), non-overlapping time-blocks, trend relationship, geographic movement relationship, and/or the like.

According to some embodiments, the functional relationships include a relationship between two or more datasets in a dataframe (e.g., hierarchical, parent-child, aggregate, etc.). In certain embodiments, the hierarchical relationship includes a relationship indicating a statistical data property of a large dataset (e.g., employee salaries) for an entity. In some embodiments, the statistical data property includes an average, a distribution (e.g., a uniform distribution, a normal distribution, a Poisson distribution, etc.), deviation, medium, and/or the like. As an example, the hierarchical relationship includes an average salary increase of a fixed number (e.g., $10) for the company X. In certain embodiments, the functional relationships include a relationship between two or more datasets that are correlated with each other, for example, a joining relationship. In some embodiments, the functional relationships include a relationship between two or more dataframes (e.g., change relationship, trend relationship, time-based relationship, time-series relationship, geographical movement relationships).

In certain embodiments, the simple list dataset is created using a uniformly distributed list based on a randomly generated number. In some embodiments, the simple list dataset is generated using a trend (e.g., incremental, decremental) with a random variation applied to the data. For example, the dataset includes a base value, with a random value adjustment (e.g., increased by a random value, decreased by a random value). As an example, the dataset includes a trend (e.g., incremental, decremental, incremental by a fixed percentage, decremental by a fixed percentage, incremental by a percentage in a predetermined range, decremental by a percentage in a predetermined range) with a random value adjustment (e.g., increased by a random value, decreased by a random value).

In certain embodiments, the hierarchical relationship has a plurality of correlated datasets, where a first dataset is a parent of a second dataset. In some embodiments, each of the plurality of correlated datasets is a simple list. In some embodiments, the time-series relationship includes a time-series of changes applied to the dataset. In certain embodiments, the geographic movement relationship includes a time-series of changes applied to geographic locations.

According to some embodiments, at the process 120, the notional data generation system is configured to add one or more system data structures (e.g., system columns based at least in part on the one or more functional relationships, for example, in an intermediate dataframe that is different from a base dataframe. In certain embodiments, the system is configured to add one or more system columns to one or more data structures corresponding to the one or more object types. In some embodiments, the system is configured to add one or more system data structures (e.g., system columns) to one of the one or more data structures. In certain embodiments, the system is configured to add a plurality of system data structures (e.g., system columns) to one of the one or more data structures. In some examples, the one or more system data structures include an index data structure used for the correlation between datasets. In certain examples, the one or more system data structure includes a time-change data structure including data representing a time-series of changes.

According to certain embodiments, at the process 125, the notional data generation system is configured to fill relationship data in the one or more system data structures (e.g., system columns) in the intermediate dataframe based at least in part on the one or more functional relationships. According to some embodiments, at the process 130, the notional data generation system is configured to generate data of the one or more object types in the intermediate dataframe based at least in part on the seed data in the base dataframe (e.g., the data in a precedent intermediate dataframe), and/or the relationship data in the one or more system data structures (e.g., system columns).

In certain embodiments, the one or more functional relationships include an index relationship that can be used to identify dataset relationships. In some embodiments, the one or more functional relationships include a change relationship defining a functional change to data (e.g., an output of a function applies to the data) in a precedent dataframe. In certain embodiments, the change relationship includes a function applied to data in a precedent dataframe (e.g., a base dataframe). In some embodiments, the change relationship also applies randomized changes. In certain embodiments, the one or more function relationships include a trend relationship including changes in a trend, for example, a function representing a trend. In some embodiments, the trend relationship also applies one or more randomized changes.

In some embodiments, the functional relationships include a time-series relationship representing data changes in a time series, for example, a function of time applying to the data. In certain embodiments, the time-series relationship represents a data change between a first dataframe and a second dataframe, where the second dataframe is after the first dataframe. In some embodiments, the time-series relationship represents a data change between a first dataframe and a second dataframe, where the second dataframe is subsequent to the first dataframe. In certain embodiments, the functional relationships include a geographic movement relationship representing geographic location change in a time series. In some embodiments, the geographic movement relationship represents a location change between a first dataframe and a second dataframe, where the second dataframe is after the first dataframe. In some embodiments, the geographic movement relationship represents a location change between a first dataframe and a second dataframe, where the second dataframe is subsequent to the first dataframe.

In certain embodiments, the notional data generation system can generate functional relationships including rules, for example, change rules, boundary rules, metric rules, and/or the like. In some examples, the change rules include one or more rules on how data will be changed. In certain examples, the change rules include one or more rules for a trend, increment, decrement, increment by a certain amount, increment by an amount within a certain range, increment by a random amount within a certain range, decrement by a certain amount, decrement by an amount within a certain range, decrement by a random amount within a certain range, and/or the like. In some embodiments, a metric rule includes the distribution of data associated with a property for an object type (e.g., an object type of a person, an object type of an organization, an object type of an employee record, an object type of an inventory, an object type of a sales record) in a dataset. For example, the metric rule includes a distribution rule on the ages in clusters in a dataset based on like a category, for instance, a distribution for junior, youth, senior, and/or the like.

In some embodiments, the notional data generation system can generate mock data for an object with randomly generated object properties, for example, a person that has a random name, a random address, random phone number, random email, how the characteristics of this person change over time. For example, generating a person gaining weight, a change rule of the current weight in relation to a previous weight of that person is the difference between the current weight and the previous weight within a threshold. As an example, the threshold is a reasonable expectation of like the transition over time for this property, as a change. For example, a person who weighed 50 pounds cannot lose 300 pounds or a person cannot lose 300 pounds in a five-hour period. In certain embodiments, a first dataset has a first set of rules in the first functional relationships and a second dataset has a second set of rules in the second functional relationships, where at least one first rule in the first set of rules is different from at least one second rule in the second set of rules.

According to certain embodiments, at the process 135, the notional data generation system is configured to generate notional data in a notional dataframe by removing the one or more system data structures (e.g., system columns) in the one or more intermediate dataframes. The notional dataframe may be different from both the base dataframe and the intermediate dataframe. According to some embodiments, at the process 140, the notional data generation system is configured to output or store the notional dataframe including data from a sequence of intermediate dataframes.

Figure 2:
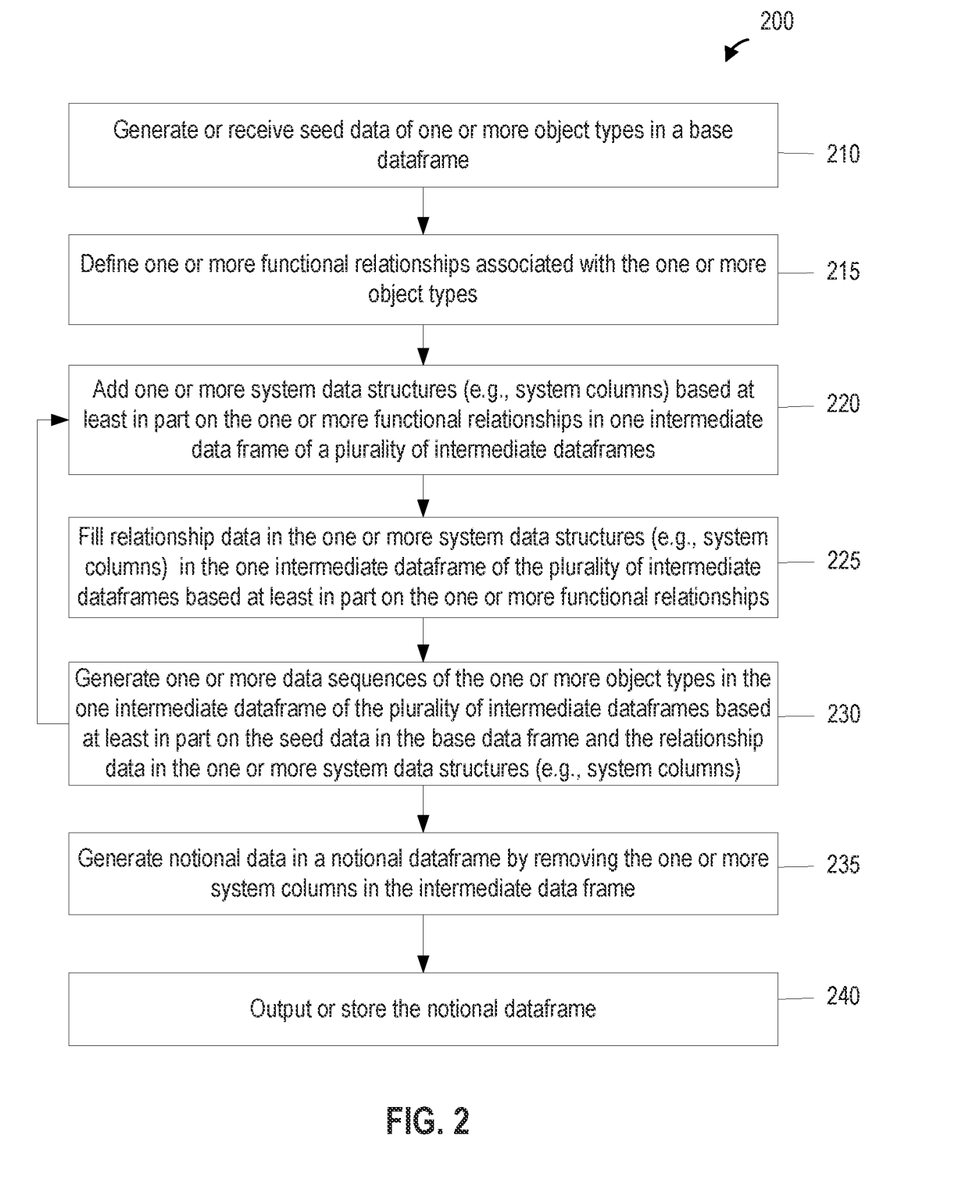
FIG. 2 is a simplified diagram showing a method for generating interrelated notional data according to certain embodiments of the present disclosure.

FIG. 2 is a simplified diagram showing a method 200 for a notional data generation system according to certain embodiments of the present disclosure. This diagram is merely an example. One of ordinary skill in the art would recognize many variations, alternatives, and modifications. The method 200 for generating notional data includes processes 210, 215, 220, 225, 230, 235, and 240. Although the above has been shown using a selected group of processes for the method 200 for generating notional data, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 200 are performed by the system 600. In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 210, a notional data generation system is configured to generate or receive seed data of one or more object types (e.g., person, address, organization, etc.) as a base dataframe. In certain embodiments, data in the base dataframe can be generated using a software application. In some embodiments, a dataset is corresponding to an object type. In certain embodiments, an object type is corresponding to a data column, and the dataframe is corresponding to a table. In some embodiments, data in the base dataframe can be generated using an existing software application for generating mock data. In some embodiments, data in the base dataframe can be generated using an existing software application for generating mock data.

According to certain embodiments, at the process 215, the notional data generation system is configured to define one or more functional relationships between two or more datasets in a dataframe and/or functional relationships between two or more dataframes (e.g., between a base dataframe and an intermediate dataframe, between two adjacent dataframes). In some embodiments, the functional relationships include, for example, simple lists, hierarchical relationship, time-series relationship (e.g., time logs), non-overlapping time-blocks, trend relationship, geographic movement relationship, and/or the like.

According to some embodiments, the functional relationships include a relationship between two or more datasets in a dataframe (e.g., hierarchical, parent-child, aggregate, etc.). In certain embodiments, the hierarchical relationship includes a relationship indicating a statistical data property of a large dataset (e.g., employee salaries) for an entity. In some embodiments, the statistical data property includes an average, a distribution (e.g., a uniform distribution, a normal distribution, a Poisson distribution, etc.), deviation, medium, and/or the like. As an example, the hierarchical relationship includes an average salary increase of a fixed number (e.g., $10) for the company X. In certain embodiments, the functional relationships include a relationship between two or more datasets that are correlated with each other, for example, a joining relationship. In some embodiments, the functional relationships include a relationship between two or more dataframes (e.g., change relationship, trend relationship, time-series relationship, geographical movement relationships).

In certain embodiments, the simple list dataset is created using a uniformly distributed list based on a randomly generated number. In some embodiments, the simple list dataset is generated using a trend (e.g., incremental, decremental) with a random variation applied to the data. For example, the dataset includes a base value, with a random value adjustment (e.g., increased by a random value, decreased by a random value). As an example, the dataset includes a trend (e.g., incremental, decremental, incremental by a fixed percentage, decremental by a fixed percentage, incremental by a percentage in a predetermined range, decremental by a percentage in predetermined range) with a random value adjustment (e.g., increased by a random value, decreased by a random value).

In certain embodiments, the hierarchical relationship has a plurality of correlated datasets, where a first dataset is a parent of a second dataset. In some embodiments, each of the plurality of correlated datasets is a simple list. In some embodiments, the time-series relationship includes a time-series of changes applied to the dataset. In certain embodiments, the geographic movement relationship includes a time-series of changes applied to geographic locations.

According to some embodiments, at the process 220, the notional data generation system is configured to add one or more system data structures (e.g., system columns) based at least in part on the one or more functional relationships, for example, in one intermediate dataframe of the plurality of intermediate dataframes. In certain embodiments, the system is configured to add one or more system data structures (e.g., columns) to one or more data structures (e.g., tables) corresponding to the one or more object types. In some embodiments, the system is configured to add one or more system data structures (e.g., system columns) to one of the one or more data structures. In certain embodiments, the system is configured to add a plurality of system data structures (e.g., system columns) to one of the one or more data structures. In some examples, the one or more system data structures include an index data structure used for the correlation between datasets. In certain examples, the one or more system data structures include a time-change data structure including data representing a time-series of changes.

According to certain embodiments, at the process 225, the notional data generation system is configured to fill relationship data in the one or more system data structures (e.g., system columns) in the one intermediate dataframe of the plurality of intermediate dataframes based at least in part on the one or more functional relationships. In some embodiments, a first filled relationship data in a first intermediate dataframe is different from a second filled relationship data for a same object. In certain embodiments, a first filled relationship data in a first intermediate dataframe is different from a second filled relationship data for a same object. For example, the object is an inventory object, and the inventory number is decreasing between two adjacent dataframes until the inventory is restocked. As an example, the first filled relationship data indicating a decrement of 5 is the same as the second filled relationship data indicating a decrement of 5. For example, the third filled relationship data indicates an increment of 100 that is different from the first or the second filled relationship data. As an example, the first filled relationship data indicating a decrement of 5 is different from the second filled relationship data indicating a decrement of 7, which are both randomly selected numbers within a range.

According to some embodiments, at the process 230, the notional data generation system is configured to generate data of the one or more object types in the one intermediate dataframe of the plurality of intermediate dataframes based at least in part on the seed data in the base dataframe, the data in a precedent intermediate dataframe, and/or the relationship data in the one or more system data structures (e.g., system columns). In certain embodiments, dataframes of the plurality of intermediate dataframes are generated repetitively. In some embodiments, the notional data generation system is configured to go back to the process 220 to generate a subsequent intermediate dataframe.

In certain embodiments, the one or more functional relationships include an index relationship that can be used to identify dataset relationships. In some embodiments, the one or more functional relationships include a change relationship defining a functional change to data (e.g., an output of a function applies to the data) in a precedent dataframe. In certain embodiments, the change relationship includes a function applied to data in a precedent dataframe (e.g., a base dataframe). In some embodiments, the change relationship also applies randomized changes. In certain embodiments, the one or more function relationships include a trend relationship including changes in a trend, for example, a function representing a trend. In some embodiments, the trend relationship also applies one or more randomized changes.

In certain embodiments, the functional relationships include a time-based relationship. In some embodiments, the functional relationships include a time-series relationship representing data changes in a time series, for example, a function of time applying to the data. In certain embodiments, the time-series relationship represents a data change between a first dataframe and a second dataframe, where the second dataframe is after the first dataframe. In some embodiments, the time-series relationship represents a data change between a first dataframe and a second dataframe, where the second dataframe is subsequent to the first dataframe. In certain embodiments, the functional relationships include a geographic movement relationship representing geographic location change in a time series. In some embodiments, the geographic movement relationship represents a location change between a first dataframe and a second dataframe, where the second dataframe is after the first dataframe. In some embodiments, the geographic movement relationship represents a location change between a first dataframe and a second dataframe, where the second dataframe is subsequent to the first dataframe.

In certain embodiments, the notional data generation system can generate functional relationships including rules, for example, change rules, boundary rules, metric rules, and/or the like. In some examples, the change rules include one or more rules on how data will be changed. In certain examples, the change rules include one or more rules for a trend, increment, decrement, increment by a certain amount, increment by an amount within a certain range, increment by a random amount within a certain range, decrement by a certain amount, decrement by an amount within a certain range, decrement by a random amount within a certain range, and/or the like. In some embodiments, a metric rule includes the distribution of data associated with a property for an object type (e.g., an object type of a person, an object type of an organization, an object type of an employee record, an object type of an inventory, an object type of a sales record) in a dataset. For example, the metric rule includes a distribution rule on the ages in clusters in a dataset based on like a category, for instance, a distribution for junior, youth, senior, and/or the like.

In some embodiments, the notional data generation system can generate mock data for an object with randomly generated object properties, for example, a person that has a random name, a random address, random phone number, random email, how the characteristics of this person change over time. For example, generating a person gaining weight, a change rule of the current weight in relation to a previous weight of that person is the difference between the current weight and the previous weight within a threshold. As an example, the threshold is a reasonable expectation of like the transition over time for this property, as a change. For example, a person who weighed 50 pounds cannot lose 300 pounds or a person cannot lose 300 pounds in a five-hour period. In certain embodiments, a first dataset has a first set of rules in the first functional relationships and a second dataset has a second set of rules in the second functional relationships, where at least one first rule in the first set of rules is different from at least one second rule in the second set of rules.

According to certain embodiments, at the process 235, the notional data generation system is configured to generate notional data in a notional dataframe by removing the one or more system data structures (e.g., system columns) in the plurality of intermediate dataframes. According to some embodiments, at the process 240, the notional data generation system is configured to output or store the notional dataframe including data from a sequence of intermediate dataframes.

According to certain embodiments, the notional data generation system is configured to model interrelationships between datasets and model functional relationships (e.g., links, object relationships, correlations, internal redundancies, etc.). In some embodiments, one or more data structures (e.g., datasets) are linked to each other representing at least a part of object relationships, for example, the data structures corresponding to one or more object types. In certain embodiments, the system is configured to obtain or receive one or more object relationships. In certain embodiments, the functional relationships are for notional datasets. In some embodiments, the notional data generation system is configured to use the object relationships to generate additional data (e.g., persons, addresses, random ages for people, etc.).

In certain embodiments, the notional data generation system can generate functional relationships including rules, for example, change rules, boundary rules, metric rules, and/or the like. In some examples, the change rules include one or more rules on how data will be changed. In certain examples, the change rules include one or more rules for a trend, increment, decrement, increment by a certain amount, increment by an amount within a certain range, increment by a random amount within a certain range, decrement by a certain amount, decrement by an amount within a certain range, decrement by a random amount within a certain range, and/or the like. In some embodiments, a metric rule includes the distribution of data associated with a property for an object type (e.g., an object type of a person, an object type of an organization, an object type of an employee record, an object type of an inventory, an object type of a sales record) in a dataset. For example, the metric rule includes a distribution rule on the ages in clusters in a dataset based on like a category, for instance, a distribution for junior, youth, senior, and/or the like.

In some embodiments, the notional data generation system can generate mock data for an object with randomly generated object properties, for example, a person that has a random name, a random address, random phone number, random email, how the characteristics of this person change over time. For example, generating a person gaining weight, a change rule of the current weight in relation to a previous weight of that person is the difference between the current weight and the previous weight within a threshold. As an example, the threshold is a reasonable expectation of like the transition over time for this property, as a change. For example, a person who weighed 50 pounds cannot lose 300 pounds or a person cannot lose 300 pounds in a five-hour period. In certain embodiments, a first dataset has a first set of rules in the first functional relationships and a second dataset has a second set of rules in the second functional relationships, where at least one first rule in the first set of rules is different from at least one second rule in the second set of rules.

For example, a functional relationship has a function of each person's salary increases between 0% to 10%. As an example, a hierarchical relationship includes a function of the average salary for 100 employees of the entire company increases by a fixed number (e.g., $10), where each employee's increase is a base value (e.g., $10) multiplied by a random number, where the random number is in the range of 0 to 2 and has an average of 1.

According to certain embodiments, the notional data generation system is configured to generate a plurality of dataframes through times, where each dataframe of the plurality dataframes includes data of one or more data structures (e.g., tables) in the dataframe at a specific time. In some embodiments, an index data structure (e.g., an index column) is added to all rows of each dataframe of the plurality of dataframes. In certain embodiments, an index data structure is added to at least a part of rows (e.g., data records) of at least one dataframe of the plurality of dataframes. In some embodiments, the index data structure is used to store data that is an output of a function. In certain embodiments, the index data structure is used to store incremental data (e.g., from 0 to 99) or decremental data (e.g., from 99 to 0). In some embodiments, the index data structure is used to store random data. In certain embodiments, the index column is used to store data randomly selected in a data range (e.g., 0 to 99, 1 to 1000). In some embodiments, a first dataset has a first set of index data, for example, data stored in rows of index data structure (e.g., column) and a second dataset has a second set of index data, where the first set of index column data is the same as the second set of index column data. In certain embodiments, a first dataset has a first set of index column data and a second dataset has a second set of index data, where the first set of index column data is different from the second set of index data.

According to some embodiments, the index data structure (e.g., the index column) is used to join a plurality of datasets. In certain embodiments, the index data structure is used to form hierarchical datasets (e.g., datasets in a tree structure). In some embodiments, the notional data generation system fills (e.g., creates) index data in the index data structure, uses the index data to generate index data of the parent dataset (e.g., divide the index data by a number, divide the index data by a number between 2 and 3 and then round down).

According to certain embodiments, the notional data generation system creates notional data changing over time, which is a time-series relationship. In some embodiments, the notional data changes over time quantitively. In certain embodiments, the notional data changes over time qualitatively. For example, the name of the organization lead changes over time. In some embodiments, the system generates a series of data (e.g., names) randomly, without overlapping, then uses the series of data to different dataframes (e.g., from oldest dataframe to newest dataframe).

According to some embodiments, the notional data generation system uses one or more system data structures (e.g., system columns). In certain embodiments, the one or more system data structures includes the index data structure. The system data structures can include index data structure and can also include other data structures, such as trending data structures storing changes to be made, type of information, and/or the like. In some embodiments, the notional data generation system changes data in a first dataframe based at least in part on the data in the trending data structures to generate data in the second dataframe, which is a subsequent dataframe (e.g., a dataframe subsequent in time).

In certain embodiments, the notional data generation system is configured to generate notional data modeling geographic movements over time, for example, by modeling the trajectory of a vehicle, a ship, or a plane traveling between different points. In some embodiments, the notional data generation system is configured to use time-series data (e.g., time logs symbol list) to generate the geographic movements corresponding to time-series data.

Figure 3:
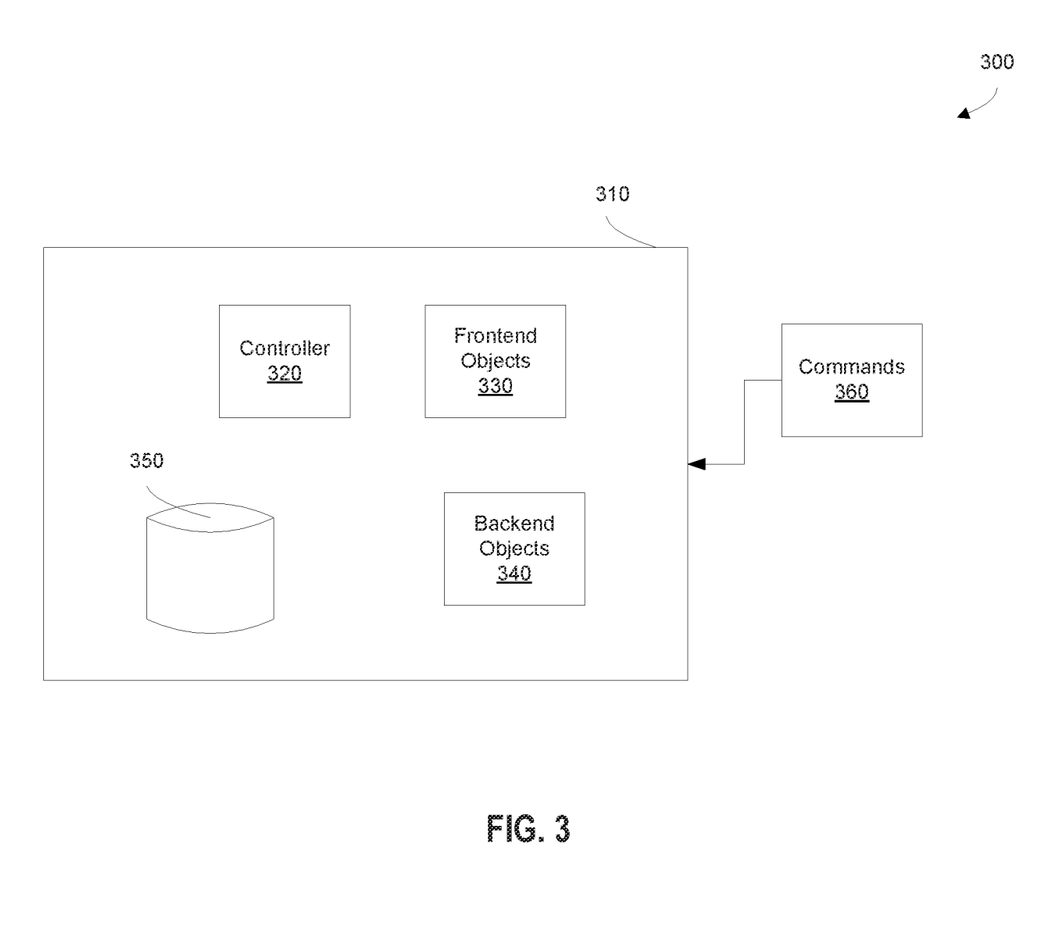
FIG. 3 is an illustrative diagram of a notional data generation environment, in accordance with certain embodiments of the present disclosure.

FIG. 3 is an illustrative example of a notional data generation environment 300, according to certain embodiments of the present disclosure. FIG. 3 is merely an example. One of the ordinary skilled in the art would recognize many variations, alternatives, and modifications. According to certain embodiments, the notional data generation environment 300 includes a notional data generation system 310 configured to receive commands 360 from one or more user devices. According to some embodiments, the notional data generation system 310 includes one or more controllers 320, one or more frontend objects 330 configured to receive commands, one or more backend objects 340 including functional relationships and one or more memories 350, also refers to as a repository 350. In certain embodiments, the repository 350 stores data for seed data, data in various dataframes, data for one or more system data structures, one or more configurations, one or more backend objects including one or more logics and/or rules. Although the above has been shown using a selected group of components in the notional data generation environment 300, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to certain embodiments, the frontend object 330 is configured to receive commands 360 from user devices and register the commands 360 to the controller 320. In some embodiments, the frontend object 330 is configured to generate a corresponding backend object 340 that includes one or more functional relationships. In certain embodiments, the functional relationships are captured in configuration objects (e.g., configuration file) and implemented using system columns. In some embodiments, the controller 320 is invoked in a session and configured to execute one or more commands against the backed objects 340.

According to some embodiments, a notional data generation system 310 is configured to generate or receive seed data of one or more object types (e.g., person, address, organization, etc.) as a base dataframe. In certain embodiments, data in the base dataframe can be generated using a software application. In some embodiments, data in the base dataframe can be generated using an existing software application for generating mock data.

According to certain embodiments, the notional data generation system 310 is configured to define one or more functional relationships between two or more datasets in a dataframe. In some embodiments, the functional relationships include, for example, simple lists, hierarchical relationship, time-series relationship (e.g., time logs), non-overlapping time-blocks, trend relationship, geographic movement relationship, and/or the like.

In certain embodiments, the simple list dataset is created using a uniformly distributed list based on a randomly generated number. In some embodiments, the simple list dataset is generated using a trend (e.g., incremental, decremental) with a random variation applied to the data. For example, the dataset includes a base value, with a random value adjustment (e.g., increased by a random value, decreased by a random value). As an example, the dataset includes a trend (e.g., incremental, decremental, incremental by a fixed percentage, decremental by a fixed percentage, incremental by a percentage in a predetermined range, decremental by a percentage in predetermined range) with a random value adjustment (e.g., increased by a random value, decreased by a random value).

In certain embodiments, the hierarchical relationship has a plurality of correlated datasets, where a first dataset is a parent of a second dataset. In some embodiments, each of the plurality of correlated datasets is a simple list. In some embodiments, the time-series relationship includes a time-series of changes applied to the dataset. In certain embodiments, the geographic movement relationship includes a time-series of changes applied to geographic locations.

According to some embodiments, the notional data generation system 310 is configured to add one or more system data structures (e.g., system columns based at least in part on the one or more functional relationships, for example, in one or more intermediate dataframes. In certain embodiments, the system is configured to add one or more system columns to one or more data structures corresponding to the one or more object types. In some embodiments, the system is configured to add one or more system data structures (e.g., system columns) to one of the one or more data structures. In certain embodiments, the system is configured to add a plurality of system data structures (e.g., system columns) to one of the one or more data structures. In some examples, the one or more system data structures include an index data structure used for the correlation between datasets. In certain examples, the one or more system data structure includes a time-change data structure including data representing a time-series of changes.

According to certain embodiments, the notional data generation system 310 is configured to fill relationship data in the one or more system data structures (e.g., system columns) in the one intermediate dataframe of the plurality of intermediate dataframes based at least in part on the one or more functional relationships. In some embodiments, a first filled relationship data in a first intermediate dataframe is different from a second filled relationship data for a same object. In certain embodiments, a first filled relationship data in a first intermediate dataframe is different from a second filled relationship data for a same object.

According to some embodiments, the notional data generation system 310 is configured to generate data of the one or more object types in the one intermediate dataframe of the plurality of intermediate dataframes based at least in part on the seed data in the base dataframe, the data in a precedent intermediate dataframe, and/or the relationship data in the one or more system data structures (e.g., system columns). In certain embodiments, dataframes of the plurality of intermediate dataframes are generated repetitively. In some embodiments, the notional data generation system is configured to generate a subsequent intermediate dataframe using the same process.

In certain embodiments, the one or more functional relationships include an index relationship that can be used to identify dataset relationships. In some embodiments, the one or more functional relationships include a change relationship defining a functional change to data in a precedent dataframe. In some embodiments, the change relationship also applies randomized changes. In certain embodiments, the one or more function relationships include a trend relationship including changes in a trend. In some embodiments, the trend relationship also applies one or more randomized changes.

In some embodiments, the functional relationships include a time-series relationship representing data changes in a time series, for example, a function of time applying to the data. In certain embodiments, the time-series relationship represents a data change between a first dataframe and a second dataframe, where the second dataframe is after the first dataframe. In some embodiments, the time-series relationship represents a data change between a first dataframe and a second dataframe, where the second dataframe is subsequent to the first dataframe. In certain embodiments, the functional relationships include a geographic movement relationship representing geographic location change in a time series. In some embodiments, the geographic movement relationship represents a location change between a first dataframe and a second dataframe, where the second dataframe is after the first dataframe. In some embodiments, the geographic movement relationship represents a location change between a first dataframe and a second dataframe, where the second dataframe is subsequent to the first dataframe.

In certain embodiments, the notional data generation system 310 can generate functional relationships including rules (e.g., stored as configurations), for example, change rules, boundary rules, metric rules, and/or the like. In some examples, the change rules include one or more rules on how data will be changed. In certain examples, the change rules include one or more rules for a trend, increment, decrement, increment by a certain amount, increment by an amount within a certain range, increment by a random amount within a certain range, decrement by a certain amount, decrement by an amount within a certain range, decrement by a random amount within a certain range, and/or the like. In some embodiments, a metric rule includes the distribution of data associated with a property for an object type (e.g., an object type of a person, an object type of an organization, an object type of an employee record, an object type of an inventory, an object type of a sales record) in a dataset. For example, the metric rule includes a distribution rule on the ages in clusters in a dataset based on like a category, for instance, a distribution for junior, youth, senior, and/or the like.

In some embodiments, the notional data generation system 310 can generate mock data for an object with randomly generated object properties, for example, a person that has a random name, a random address, random phone number, random email, how the characteristics of this person change over time. For example, generating a person gaining weight, a change rule of the current weight in relation to a previous weight of that person is the difference between the current weight and the previous weight within a threshold. As an example, the threshold is a reasonable expectation of like the transition over time for this property, as a change. For example, a person who weighed 50 pounds cannot lose 300 pounds or a person cannot lose 300 pounds in a five-hour period. In certain embodiments, a first dataset has a first set of rules in the first functional relationships and a second dataset has a second set of rules in the second functional relationships, where at least one first rule in the first set of rules is different from at least one second rule in the second set of rules.

According to certain embodiments, the notional data generation system 310 is configured to generate notional data in a notional dataframe by removing the one or more system data structures (e.g., system columns) in the one or more intermediate dataframes. According to some embodiments, the notional data generation system 310 is configured to output or store the notional dataframe including data from a sequence of intermediate dataframes.

As an example, the notional data generation system models data for items (e.g., cereals) that each has a different number of average sales per day. For example, the system generates a random ID and also generates the number, the average number of sales per day, which is a uniformly distributed random number between 5 and 10, which can be stored in a configuration (e.g., a rule). As an example, the notional data generation system models sales data going up over time (e.g., going up by 1%, going up by 8%).

In some embodiments, the repository 350 can include seed data, data for intermediate dataframes, data for notional dataframe, rules, logics, configurations, frontend objects, backend objects, and/or the like. The repository 350 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the notional data generation environment 300 can execute software or firmware stored in non-transitory computer-readable medium to implement various processing steps. Various components and processors of the notional data generation environment 300 can be implemented by one or more computing devices including, but not limited to, circuits, a computer, a cloud-based processing unit, a processor, a processing unit, a microprocessor, a mobile computing device, and/or a tablet computer. In some cases, various components of the notional data generation environment 300 (e.g., the notional data generation system 310, the controller 320, one or more processors) can be implemented on a shared computing device. Alternatively, a component of the notional data generation environment 300 can be implemented on multiple computing devices. In some implementations, various modules and components of the notional data generation environment 300 can be implemented as software, hardware, firmware, or a combination thereof. In some cases, various components of the notional data generation environment 300 can be implemented in software or firmware executed by a computing device.

Various components of the notional data generation environment 300 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 4:
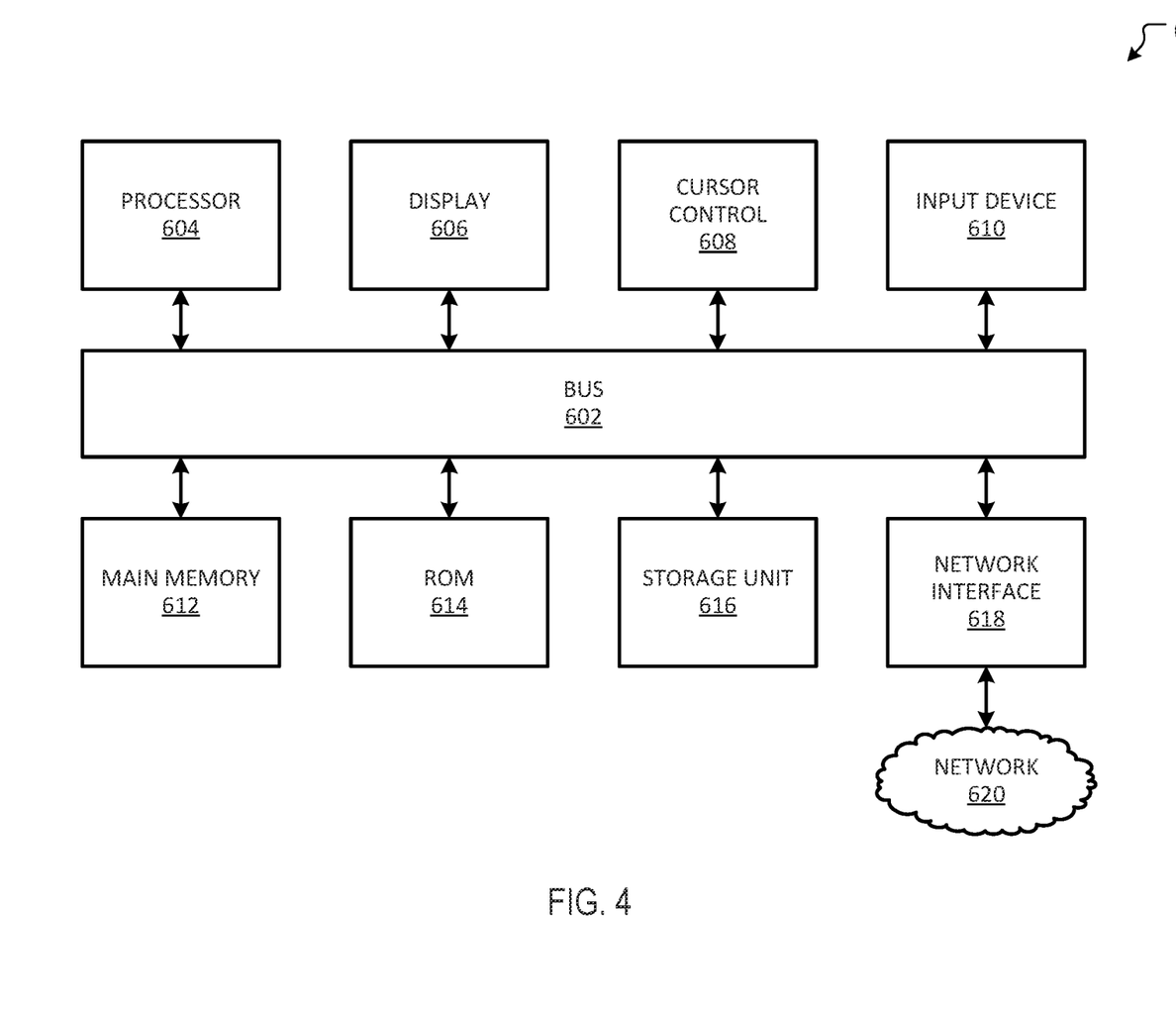
FIG. 4 is a simplified diagram showing a computing system for implementing a system for generating interrelated notional data according to one embodiment of the present disclosure.

FIG. 4 is a simplified diagram showing a computing system 600 for implementing a system 600 for generating national data in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the methods 100, and/or 200 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to certain embodiments, a method is disclosed for generating notional data, the method comprising: receiving seed data of one or more object types in a base dataframe; defining one or more functional relationships associated with the one or more object types, at least one functional relationship of the one or more functional relationships specifying a change to seed data of one object type of the one or more object types; generating data of the one or more object types based at least in part on the seed data in the base dataframe and the one or more functional relationships; and generating the notional data based at least in part on the generated data of the one or more object types, wherein the method is performed using one or more processors. For example, the method is implemented according to at least FIG. 1, FIG. 2, FIG. 3, and/or FIG. 4.

In some embodiments, the generating data of the one or more object types comprises: adding one or more system columns to one or more data structures corresponding to the one or more object types based at least in part on the one or more functional relationships. In certain embodiments, the method further comprises: filling relationship data in the one or more system columns in the one or more data structures based at least in part on the one or more functional relationships. In some embodiments, the generating data of the one or more object types comprises: generating the data of the one or more object types based at least in part on the seed data in the base dataframe and the relationship data in the one or more system columns. In certain embodiments, the method further comprises: outputting or storing the notional data. In some embodiments, the one or more functional relationships include at least one selected from a group consisting of hierarchical relationship, time-series relationship, geographic movement relationship, and trend relationship.

In some embodiments, the adding one or more system columns comprises: adding the one or more system columns in one or more data structures in an intermediate dataframe different from the base dataframe. In certain embodiments, the generating the notional data comprises: generating the notional data in a notional dataframe by removing the one or more system columns in the intermediate dataframe. The notional dataframe is different from the base dataframe and the intermediate dataframe. In some embodiments, the one or more data structures include one or more data tables.

According to certain embodiments, a system is disclosed for generating notional data, the system comprising: one or more memories having instructions stored therein; and one or more processors configured to execute the instructions and perform operations. The operations comprise: receiving seed data of one or more object types in a base dataframe; defining one or more functional relationships associated with the one or more object types, at least one functional relationship of the one or more functional relationships specifying a change to seed data of one object type of the one or more object types; generating data of the one or more object types based at least in part on the seed data in the base dataframe and the one or more functional relationships; and generating the notional data based at least in part on the generated data of the one or more object types. For example, the system is implemented according to at least FIG. 1, FIG. 2, FIG. 3, and/or FIG. 4.

In some embodiments, the generating data of the one or more object types comprises: adding one or more system columns to one or more data structures corresponding to the one or more object types based at least in part on the one or more functional relationships. In certain embodiments, the operations further comprise: filling relationship data in the one or more system columns in the one or more data structures based at least in part on the one or more functional relationships. In some embodiments, the generating data of the one or more object types comprises: generating the data of the one or more object types based at least in part on the seed data in the base dataframe and the relationship data in the one or more system columns. In certain embodiments, the adding one or more system columns comprises: adding the one or more system columns in one or more data structures in an intermediate dataframe different from the base dataframe. In some embodiments, the generating the notional data comprises: generating the notional data in a notional dataframe by removing the one or more system columns in the intermediate dataframe. The notional dataframe is different from the base dataframe and the intermediate dataframe. In certain embodiments, the operations further comprise: outputting or storing the notional data. In some embodiments, the one or more functional relationships include at least one selected from a group consisting of: hierarchical relationship, time-series relationship, geographic movement relationship, and trend relationship. In certain embodiments, the one or more data structures include one or more data tables.

According to certain embodiments, a method is disclosed for generating notional data, the method comprising: receiving seed data of one or more object types in a base dataframe; defining one or more functional relationships associated with the one or more object types, at least one functional relationship of the one or more functional relationships specifying a change to seed data of one object type of the one or more object types; adding, in one intermediate dataframe of a plurality of intermediate dataframes, one or more system columns to one or more data structures corresponding to the one or more object types based at least in part on the one or more functional relationships; filling relationship data in the one or more system columns in the one or more data structures in the one intermediate dataframe of the plurality of intermediate dataframes based at least in part on the one or more functional relationships; generating data of the one or more object types in the one intermediate dataframe of the plurality of dataframes based at least in part on the seed data in the base dataframe and the one or more functional relationships; and generating the notional data based at least in part on the generated data of the one or more object types. The method is performed using one or more processors. For example, the method is implemented according to at least FIG. 1, FIG. 2, FIG. 3, and/or FIG. 4.

In some embodiments, the one intermediate dataframe is a first intermediate dataframe; the data is one or more first data sequences; the one or more functional relationships include a time-based relationship; and the generating data of the one or more object types comprises: generating one or more second data sequences in a second intermediate dataframe of the plurality of intermediate dataframes, the second intermediate dataframe being subsequent to the first intermediate dataframe, by at least: adding, in the second intermediate dataframe, the one or more data structures corresponding to the one or more object types based at least in part on the one or more functional relationships; filling the relationship data in the one or more data structures in the second intermediate dataframe based at least in part on the one or more functional relationships; and generating the one or more second data sequences of the one or more object types in the second intermediate dataframe based at least in part on the one or more first data sequences in the first intermediate dataframe and the one or more functional relationships.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for generating notional data for data processing, the method comprising:
receiving seed data of one or more object types in a base dataframe;
defining one or more functional relationships associated with the one or more object types, at least one functional relationship of the one or more functional relationships specifying a change to seed data of one object type of the one or more object types;

synthetically generating intermediate data of the one or more object types based at least in part on the seed data in the base dataframe and the one or more functional relationships by at least:
    adding one or more system columns to one or more data structures in an intermediate dataframe corresponding to the one or more object types based at least in part on the one or more functional relationships; and
    generating the intermediate data by filling relationship data in the one or more system columns in the one or more data structures based at least in part on the one or more functional relationships;
synthetically generating the notional data based at least in part on the generated intermediate data of the one or more object types and the one or more system columns; and
outputting the generated notional data to one or more memories that store the generated notional data;
wherein the method is performed using one or more processors for data processing.

2. The method of claim 1, wherein the synthetically generating intermediate data of the one or more object types comprises:
    synthetically generating the intermediate data of the one or more object types based at least in part on the seed data in the base dataframe and the relationship data in the one or more system columns.

3. The method of claim 1, wherein the
intermediate dataframe is different from the base dataframe.

4. The method of claim 3, wherein the synthetically generating the notional data comprises:
    synthetically generating the notional data in a notional dataframe by removing the one or more system columns in the intermediate dataframe;
    wherein the notional dataframe is different from the base dataframe and the intermediate dataframe.

5. The method of claim 1, wherein the one or more functional relationships include at least one selected from a group consisting of hierarchical relationship, time-series relationship, geographic movement relationship, and trend relationship.

6. The method of claim 1, wherein the one or more data structures include one or more data tables.

7. The method of claim 1, wherein the synthetically generating intermediate data of the one or more object types comprises:
    generating the relationship data in one of the one or more system columns by applying a domain-specific random value adjustment to the seed data using a trend relationship, the trend relationship being one of the one or more functional relationships.

8. The method of claim 1, wherein the synthetically generating intermediate data of the one or more object types comprises:
    generating the relationship data in one of the one or more system columns based at least in part on the seed data in the base dataframe and a hierarchical relationship, the hierarchical relationship being one of the one or more functional relationships.

9. A system for generating notional data for data processing, the system comprising:
    one or more memories having instructions stored therein; and
    one or more processors configured to execute the instructions and perform operations comprising:
        receiving seed data of one or more object types in a base dataframe;
        defining one or more functional relationships associated with the one or more object types, at least one functional relationship of the one or more functional relationships specifying a change to seed data of one object type of the one or more object types;
        synthetically generating intermediate data of the one or more object types based at least in part on the seed data in the base dataframe and the one or more functional relationships by at least:
            adding one or more system columns to one or more data structures in an intermediate dataframe corresponding to the one or more object types based at least in part on the one or more functional relationships; and
            generating the intermediate data by filling relationship data in the one or more system columns in the one or more data structures based at least in part on the one or more functional relationships;
        synthetically generating the notional data based at least in part on the generated intermediate data of the one or more object types and the one or more system columns; and
        outputting the generated notional data to one or more memories that store the generated notional data.

10. The system of claim 9, wherein the synthetically generating intermediate data of the one or more object types comprises:
    synthetically generating the intermediate data of the one or more object types based at least in part on the seed data in the base dataframe and the relationship data in the one or more system columns.

11. The system of claim 9, wherein the
intermediate dataframe is different from the base dataframe.

12. The system of claim 11, wherein the synthetically generating the notional data comprises:
    synthetically generating the notional data in a notional dataframe by removing the one or more system columns in the intermediate dataframe;
    wherein the notional dataframe is different from the base dataframe and the intermediate dataframe.

13. The system of claim 9, wherein the one or more functional relationships include at least one selected from a group consisting of hierarchical relationship, time-series relationship, geographic movement relationship, and trend relationship.

14. The system of claim 9, wherein the one or more data structures include one or more data tables.

15. The system of claim 9, wherein the synthetically generating intermediate data of the one or more object types comprises:
    generating the relationship data in one of the one or more system columns by applying a domain-specific random value adjustment to the seed data using a trend relationship, the trend relationship being one of the one or more functional relationships.

16. The system of claim 9, wherein the synthetically generating intermediate data of the one or more object types comprises:
    generating the relationship data in one of the one or more system columns based at least in part on the seed data in the base dataframe and a hierarchical relationship, the hierarchical relationship being one of the one or more functional relationships.

17. A method for generating notional data for data processing, the method comprising:
- receiving seed data of one or more object types in a base dataframe;
- defining one or more functional relationships associated with the one or more object types, at least one functional relationship of the one or more functional relationships specifying a change to seed data of one object type of the one or more object types;
- adding, in one intermediate dataframe of a plurality of intermediate dataframes, one or more system columns to one or more data structures corresponding to the one or more object types based at least in part on the one or more functional relationships;
- filling relationship data in the one or more system columns in the one or more data structures in the one intermediate dataframe of the plurality of intermediate dataframes based at least in part on the one or more functional relationships to synthetically generate intermediate data of the one or more object types in the one intermediate dataframe of the plurality of dataframes; and
- synthetically generating the notional data based at least in part on the generated intermediate data of the one or more object types and the one or more system columns; and
- outputting the generated notional data to one or more memories that store the generated notional data;
- wherein the method is performed using one or more processors for data processing.

18. The method of claim 17, wherein the one intermediate dataframe is a first intermediate dataframe;
- wherein the data is one or more first data sequences;
- wherein the one or more functional relationships include a time-based relationship;
- wherein the synthetically generating intermediate data of the one or more object types comprises:
  - generating one or more second data sequences in a second intermediate dataframe of the plurality of intermediate dataframes, the second intermediate dataframe being subsequent to the first intermediate dataframe, by at least:
  - adding, in the second intermediate dataframe, the one or more data structures corresponding to the one or more object types based at least in part on the one or more functional relationships;
  - filling the relationship data in the one or more data structures in the second intermediate dataframe based at least in part on the one or more functional relationships; and
  - generating the one or more second data sequences of the one or more object types in the second intermediate dataframe based at least in part on the one or more first data sequences in the first intermediate dataframe and the one or more functional relationships.

* * * * *